US006734231B2

(12) United States Patent
Creusen et al.

(10) Patent No.: US 6,734,231 B2
(45) Date of Patent: May 11, 2004

(54) EASILY DISTRIBUTABLE PIGMENT COMPOSITIONS

(75) Inventors: Gerardus Lambertus Creusen, Elsloo (NL); Leonardus Johannes Hubertus Erkens, Maastricht (NL); Robertus Josef Mathijs Hermans, Banholt (NL); Nico Adelin Valentin Roox, Kesselt (BE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/163,918

(22) Filed: Jun. 6, 2002

(65) Prior Publication Data

US 2003/0033958 A1 Feb. 20, 2003

(30) Foreign Application Priority Data

Jul. 9, 2001 (EP) .............................. 01810687

(51) Int. Cl.[7] .............. C08K 5/12; C08J 3/00
(52) U.S. Cl. .......... 523/353; 524/88; 524/89; 524/99; 524/106; 524/424; 524/430; 524/403; 407/408; 407/409; 407/434; 407/592; 407/593
(58) Field of Search .............. 523/353; 524/592, 524/593, 88, 95, 99, 106, 424, 430, 403, 407, 408, 409, 420, 434

(56) References Cited

U.S. PATENT DOCUMENTS

| 3,810,854 A | 5/1974 | Doi et al. ............... 260/21 |
| 3,844,806 A | 10/1974 | Wegmann et al. ........ 106/193 |
| 4,191,680 A | 3/1980 | Wegmann et al. ........... 260/42 |
| 4,713,411 A | 12/1987 | Kanou et al. ............ 524/560 |
| 5,075,366 A | 12/1991 | Moltrasio ............... 524/306 |
| 5,237,004 A | * 8/1993 | Wu et al. ................ 525/85 |
| 5,282,893 A | 2/1994 | Komiya .................. 106/19 |
| 6,124,067 A | * 9/2000 | Mikuriya et al. ........ 430/111.3 |

FOREIGN PATENT DOCUMENTS

| DE | 1769532 | 3/1972 |
| EP | 0432480 | 6/1991 |
| EP | 0770648 | 5/1997 |
| EP | 0849339 | 6/1998 |
| EP | 0902061 | 3/1999 |
| EP | 0947540 | 10/1999 |
| GB | 1240233 | 7/1971 |
| WO | 91/13931 | 9/1991 |
| WO | 97/00157 | 1/1997 |
| WO | 99/48988 | 9/1999 |

OTHER PUBLICATIONS

English Abstract for EP 0849339 (1998).
Derwent Abstr. 1990–344039 [46] for JP 02247251 (Oct. 3, 1990).

* cited by examiner

Primary Examiner—Kriellion A. Sanders
(74) Attorney, Agent, or Firm—Tyler A. Stevenson

(57) ABSTRACT

The present invention relates to easily distributable pigment compositions consisting essentially of pigment and urea-aldehyde resin, wherein the weight ratio of pigment to urea-aldehyde resin is generally in the range of 40:60 to 90:10, a process for their production and their use in pigmenting high molecular weight organic materials. Due to the excellent dispersibility of the pigment compositions of this invention, uniform distribution of pigment particles throughout the entire application media and, therefore, excellent color consistency is readily achieved. Products, for example solvent paints, spread coatings and powder coatings, comprising the stir-in pigment compositions show high color strength, high gloss and low haze as well as very good light fastness and weathering fastness.

18 Claims, No Drawings

EASILY DISTRIBUTABLE PIGMENT COMPOSITIONS

The invention relates to easily distributable pigment compositions, a process for their production and their use in pigmenting high molecular weight organic materials. Due to the excellent dispersibility of the pigment compositions of this invention, uniform distribution of pigment particles throughout the entire application media and, therefore, excellent color consistency is readily achieved. Products, for example solvent paints, spread coatings and powder coatings, comprising the stir-in pigment compositions show high color strength, high gloss and low haze as well as very good light fastness and weathering fastness.

In general, after being mixed into an aqueous or solvent-borne resin system, an organic pigment must be further dispersed prior to its final application in order to ensure that the organic pigment is homogeneously dispersed in the resin system. This additional dispersion step generally requires that the pigment be dispersed for a period of 2 to 48 hours using milling equipment, such as a vertical or horizontal bead mill or an attritor mill with milling media, such as glass beads or stainless steel balls. Since this additional dispersion step is both time-consuming and costly, the elimination of this step by using pigments that are adequately dispersed during a simple mixing step, without the need for the additional dispersing step, is a great advantage.

U.S. Pat. No. 5,075,366 discloses a masterbatch, i.e. a composition having a high content of a pigment or a dye and a polymer, consisting essentially of
(a) a resin such as an urea-aldehyde resin,
(b) a second component selected from the group of (b1) citric, acetylcitric or tartaric acid glycol polyalkyleneglycol esters and (b2) citric, acetylcitric or tartaric acid monoalcohol esters in admixture with polyalkyleneglycols, and
(c) dyes and/or pigments and/or additives.

The masterbatches of U.S. Pat. No. 5,075,366 are prepared by
(a) mixing the resin with the dye or pigment in a mixing apparatus,
(b) addition of the second component, which may contain additives, resulting in a mass,
(c) further mixing that mass to obtain a homogenous powder, and
(d) extrusion of the mass at a temperature not higher than 150° C.

The disadvantage of this masterbatch and its process is the additional use of a second component.

EP-A-947,540 claims a dry master batch comprising at least one pigment, wherein the masterbatch contains at least 80% by weight calculated on the weight of the mixture of particles of granulometry of lower than 1 µm of said of least one pigment dispersed in said carrier. The process of EP-A-947,540 uses at least one turbo-mixer and solvents, which are disadvantageous in an industrial process. Further, the product contains fine powder which has to be removed in order to obtain a satisfactory final product.

EP-A-902,061 discloses stir-in pigment compositions comprising 85 to 99.5 parts by weight of a pigment and 0.5 to 15 parts by weight of a vinylpyrrolidone polymer or copolymer.

MICROLEN® UA (Ciba Speciality Chemicals Inc.) is a mixture of 45 to 60% of an organic pigment, 2% of a dispersing agent (ethoxylated amine), 6.5 to 8.6% of polyethylene wax (LMWPE) and 46.5 to 29.4% of an urea-aldehyde resin (Laropal® A81).

Microlen® UA is produced by a wet process with a ball mill wherein PE-wax and dispersing agent have to be added and only a specific range of pigments can be processed. The final product is almost spherical shaped with a particle size of about 1–3 mm.

Therefore, the object of this invention is to provide a simple and environment-friendly process for the preparation of easily distributable pigment compositions, which show high color strength, high gloss and low haze when incorporated in high molecular weight organic materials, in particular solvent paints, spread coatings and powder coatings.

Accordingly, the present application is directed to a process for preparing a pigment composition comprising
a) mixing a pigment and a urea-aldehyde resin and/or a urea-ketone resin in a homogenizer or in the inlet (feeding) zone of the extruder, and
b) extruding the mixture obtained in step a), and
to a pigment composition obtainable by the process.

Due to the excellent dispersibility of the pigment compositions of this invention, uniform distribution of pigment particles throughout the entire application media and, therefore, excellent color consistency is readily achieved. Products, for example solvent paints, spread coatings and powder coatings, comprising the pigment compositions show high color strength, high gloss and low haze as well as very good light fastness and weathering fastness.

In step a) of the process according to the present invention the pigment and the urea-aldehyde resin and/or urea-ketone resin are mixed. The mixing can be carried out in a separate homogenizer or in the inlet (feeding) zone of the extruder. If the mixing is carried out in the inlet zone of the extruder the pigment and the resin can be jointly introduced at the beginning of the inlet zone or the resin is added at first and the pigment is added subsequently.

However, mixing of the components in a separate homogenizer is preferred. The homogenizer is not specially limited. In principal any device can be used, which provides proper mixing, i.e. a homogeneous distribution of the components, such as low-speed or high-speed mixers, tumblers or blenders. A tumbler is preferred.

If the mixing is carried out in a homogenizer, the pigment and the resin are generally mixed for 5 to 120 minutes, preferably 10 to 30 minutes, most preferably 15 minutes at a temperature ranging from 5 to the glass transition temperature of the resin, for example 50° C. in case of Laropal® A81, preferably 15 to 25° C.

The weight ratio of pigment to urea-aldehyde and/or urea-ketone resin is generally in the range of 40:60 to 90:10, preferably 50:50 to 80:20.

Urea-aldehyde resins and urea-ketone resins belong to the class of aminoplast resins and are curable condensation products of ureas and aldehydes, such as acetaldehyde, glyoxal and formaldehyde, in particular formaldehyde, or ketones. They are characterized by the following repeating unit

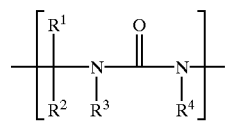

wherein $R^1$, $R^2$, $R^3$ and $R^4$ are independently of each other hydrogen or a organic group, like a linear or branched $C_{1-6}$-alkyl group. Urea-aldehyde resins, in particular urea-formaldehyde resins, are preferred. Relevant information on raw materials used to produce urea-formaldehyde resins can be found in B. Meyer: Urea-Formaldehyde Resins, Addison-Wesley, London 1979. Most preferred are LAROPAL® A81 (BASF AG, softening point: 80–95° C.) and A101 (BASF AG, softening point: 95–110° C.).

In general any organic or inorganic pigment can be used in the process according to the present invention, if it is compatible with urea-formaldehyde and the urea-ketone resins and is processable with the process according to the present application. Depending on the application a crude or unfinished pigment can be used, but preferably the pigmentary form of the pigment is employed. Granules, as described, for example, in U.S. Pat. No. 5,985,019, can also be processed according to the inventive process.

Suitable organic pigments are, for example, described in W. Herbst, K. Hunger, Industrielle Organische Pigmente, $2^{nd}$ revised edition, 1995. Especially suitable organic pigments for the present pigment compositions are organic pigments selected from the group consisting of azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solid solution thereof; especially an azo, dioxazine, diketopyrrolopyrrole, quinacridone, phthalocyanine, indanthrone or iminoisoindolinone pigment, or a mixture or solid solution thereof.

Notable organic pigments useful in the present stir-in pigment compositions are those pigments described in the Color Index, including the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

Suitable inorganic pigments useful in the present pigment compositions are selected from the group consisting of carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, and mixtures thereof.

The term "mixtures thereof" also comprises mixtures of inorganic and organic pigments as described, for example in U.S. Pat. No. 5,976,238.

Extrusion can be carried out on co-rotating twin screw extruders, in particular co-rotating closely intermeshing twin screw extruders, and counter-rotating twin screw extruders. Single screw extruders could be used as well, but should have a suitable screw design.

A typical twin screw extruder has a L/D ratio between 14 and 52, preferably between 30 and 50. The throughput strongly depends on the characteristics of the components extruded, for example organic and inorganic pigments, and the diameter of the extruder used, but, if an extruder with an diameter of 16 to 25 mm is used, the throughput is generally in the range of 0.5 kg/h to 30 kg/h, preferably 1 kg/h to 20 kg/h.

The temperature profile of the extruder depends on the resin and the pigments used as well as the layout of the extruder and the screw design. In general the temperature profile lies between 70° C., preferably 110° C. and the decomposition temperature of the resin, for example 140° C. for LAROPAL® A81.

Optionally, the extruder can be equipped with particular means for degassing and/or filtering the melt.

The extrudate is crushed, for example broken or cut, and optionally ground and/or sieved. The broken extrudate can be used as such in powder coatings, whereas the use of the pigment compositions according to the present application in solvent paints or spread coatings requires further grinding and optionally sieving of the crushed extrudate.

The ground and sieved pigment compositions for solvent paints or spread coating have a maximum particle size below 500 μm, preferably the particle size of the pigment compositions lies within the range of 100 to 500 μm.

Surprisingly the pigment compositions obtained according to the process of the present invention are dispersed quickly by simply stirring the pigment into an ink or paint system without a dispersion step in a bead mill or other high shear-inducing equipment. Thus the inventive pigment compositions are ideal for use as stir-in pigments, where they eliminate the time and energy-consuming step of bead milling as well as the expense of cleaning the bead mills.

The invention relates also to an organic or inorganic, high molecular weight or low molecular weight material, especially a high molecular weight organic material comprising the above-described compositions according to the invention in a tinctorially effective amount, generally in the range from 0.01 to 70% by weight, especially from 0.01 to 30% by weight, preferably from 0.01 to 10% by weight, based on the organic or inorganic material.

The present invention relates also to the use of compositions according to the invention as colourants, especially for colouring or pigmenting organic or inorganic, high molecular weight or low molecular weight material, especially high molecular weight organic material.

Hence, further embodiments of the instant invention relate to the use of the inventive pigment composition for the preparation of dispersions, paint systems, coating materials, color filters, inks, preferably printing inks, as well as color toners comprising the inventive pigment compositions.

The high molecular weight material may be organic or inorganic and may refer to synthetic and/or natural substances. It may consist of, for example, natural resins or drying oils, natural rubber or casein or modified natural substances, such as chlorinated rubber, oil-modified alkyd resins, viscose, or cellulose ethers or esters, such as ethylcellulose, cellulose acetate, propionate or butyrate, cellulose acetobutyrate and also nitrocellulose, but especially completely synthetic organic polymers (thermosetting plastics and thermo-plastics), as can be obtained by polymerisation, for example by polycondensation or polyaddition The class of the polymers includes, for example polyolefins such as polyethylene, polypropylene, polyisobutylene, also substituted polyolefins, such as polymerisation products of monomers such as vinyl chloride, vinyl acetate, styrene, acrylonitrile, acrylic acid esters, methacrylic acid esters, fluorinated polymerisation products, such as polyfluoroethylene or polytrifluorochloroethylene or a tetrafluoroethylene/hexafluoropropylene mixed polymerisation product, and also copolymerisation products of the said monomers, especially ABS (acrylonitrile/butadiene/styrene) or EVA (ethylene/vinyl acetate). From the series of the polyaddition and polycondensation resins there may be used, for example, condensation products of formaldehyde with phenols, so-called phenoplasts, and condensation products of formaldehyde and urea or thiourea, and also melamine, so-called aminoplasts, also the polyesters used as surface-coating resins, either saturated, such as alkyd resins, or unsaturated, such as maleic resins; also linear polyesters, polyamides, polyurethanes, polycarbonates, polyphenylene oxides, silicones or silicone resins.

The present invention relates furthermore to the use of the compositions according to the invention in the production of inks, for printing inks in printing processes, for flexographic printing, screen printing, the printing of packaging, security colour printing, intaglio printing or offset printing, for preliminary stages of printing and for printing textiles; in the production of colourants for surface-coatings that can be used in industry or commerce, for textile decoration and industrial labelling; especially colourants for roller coatings or powder coatings or for automotive lacquers, for high-solids (low-solvent), solvent or metallic surface-coatings or for pigmented formulations for solvent paints or spread coatings; in the production of coloured plastics for coatings, fibres, plates or for shaped substrates; in the production of non-impact-printing material for digital printing, for thermal wax transfer printing, ink-jet printing or for thermal transfer printing; or in the production of polymeric coloured particles, toners, dry copy toners, liquid copy toners or electrophotographic toners.

The high molecular weight organic substances are coloured with the compositions in accordance with the invention, for example by admixing such a composition, where appropriate in the form of masterbatches, with the substrates using mixing apparatuses, as a result of which the colourant is uniformly distributed, i.e. dissolved or finely dispersed, in the high molecular weight material. The high molecular weight organic material together with the admixed composition is then generally processed using methods known per se such as calendering, compression moulding, extrusion, coating, spinning, pouring or injection moulding, as a result of which the coloured material usually obtains its final form. Admixture of the colourant can also be effected immediately prior to the actual processing step For the purpose of colouring surface-coatings and printing inks, the high molecular weight organic materials and the compositions according to the invention, optionally together with additional ingredients, such as fillers, dyes, pigments, siccatives or plasticisers, are finely dispersed or dissolved together in an organic solvent or solvent mixture, it being possible to use a procedure in which the individual components are dispersed or dissolved separately or in which a plurality thereof are dispersed or dissolved together, and only then all of the components combined. Processing is carried out using customary methods, for example by spraying, film-spreading or by one of the many printing methods, after which the surface-coating or the printing ink, where appropriate after drying beforehand, is advantageously cured thermally or by irradiation.

The present easy distributable pigment compositions are used alone or in the presence of other pigments or dyes.

Due to the excellent dispersibility of the stir-in pigment compositions of this invention, uniform distribution of pigment particles throughout the entire application media and, therefore, excellent color consistency is readily achieved. Products, for example solvent paints, powder coatings and spread coatings, comprising the stir-in pigment compositions show high color strength, high gloss and low haze as well as high weathering fastness and light fastness.

The following examples illustrate various embodiments of the invention, but the scope of the invention is not limited thereto.

EXAMPLES

Example 1

A mixture of 4 kg of C.I. Pigment Yellow 184 (IRGACOLOR Yellow 3GLM from Ciba Specialty Chemicals Inc.) and 1 kg of an urea-aldehyde resin (LAROPAL®A81 from BASF AG; softening point: 80–95° C.; melt viscosity (DIN 53019): 200 Pa·s at about 123° C.) is tumbled for 15 minutes. Afterwards, the mixture is metered into a co-rotating twin screw extruder with L/D=43 (D=25; r=400 rpm) with a throughput of 8 kg/h. The temperature profile is set to 110° C. The melt is degassed at 34 to 36 L/D. The extrudate then is broken, ground and sieved to particles having a particle size below 500 $\mu$m. The concentration of C.I. Pigment Yellow 184 in the preparation is 80% by weight.

The colour strength is:
  in spread coating with regard to a paste of C.I. Pigment Yellow 184 (IRGACOLOR Yellow 3GLM): 128%.
  in solvent paint (alkyd/melamine system) with regard to pure pigment C.I. Pigment Yellow 184 (IRGACOLOR Yellow 3GLM): stir-in: 170%, wherein the colour strength is determined as follows:
  Spread Coating In a 0.5 liter container 11.43 g of TiO$_2$ paste (70% paste ), xg of easily distributable pigment composition conform 0.8% of pure pigment (reduction 1:10) and 300 g of PVC Plastisol are added. With a 4 cm toothed disc the plastisol is stirred for 30 minutes at 1000 rpm until a complete homogeneous mixture is achieved. Then the mixture is spread out over a paper with a thickness of 0.6 mm and subsequently the plastisol is gelified during 4 minutes at 180° C. in a MATHIS oven. After gelification the flexible PVC foil with a reduced thickness of 0.4 mm can be released from the paper and colour strength measurements can be carried out after the foil is cooled down.

As standard a pigment paste produced on a three-roll mill is used wherein the same batch of pigment is used as in the pigment composition.

Alkyd Melamine Paint

A mill base is prepared in a 500 ml bottle (bottle diameter 7 cm) with a pigment content of 60% C.I. Pigment Yellow 184, Media solids content of 45% and a pigment/binder ratio of 1/0.3. The millbase is cavitated during 30 minutes with a Dispermat (blade diameter 3.1 cm) at 4400 rpm. After 30 minutes the pigment particles on a Hegman gauge must be <5 $\mu$m. The let down is prepared in a 500 ml bottle (bottle diameter 7 cm) from the mill base with an endpigment content of 25% and a pigment/binder ratio of 1/1.60. During the let down no beads are needed and the let down is stirred during 10 minutes with a Dispermat (blade diameter 3.1 cm) at 4400 rpm.

As standard the pure pigment C.I. Pigment Yellow 184 is used with the same batch of pigment as the pigment composition. During the let down of the pure pigment and 350 g of 2 mm beads are added to a 1000 ml bottle. The let down is cavitated during 30 minutes with a Dispermat (blade dia. 3.1 cm) at 2500 rpm. Final pigment content and pigment/binder ratio are equal.

The product is considerably higher saturated and shows the highest gloss and lowest haze compared to the above described comparative products. In addition, the dispersion exhibits no flocculation in a 10:90 reduction.

Example 2

A mixture of 650 g C.I. Pigment Red 254 (IRGAZIN RED 2030 from Ciba Specialty Chemicals Inc.) and 350 g of an urea-aldehyde resin (LAROPAL®A81 from BASF AG) is tumbled for 15 minutes. Afterwards, the mixture is metered into a co-rotating twin screw extruder with L/D=14 (D=16 mm; r=250 rpm) with a throughput of 1.1 kg/h. The temperature profile is set to 130° C. The extrudate is then broken, ground and sieved to particles having a particle size below 500 µm. The concentration of g C.I. Pigment Red 254 in the preparation is 65% by weight. The colour strength of the preparation is: in solvent paint (alkyd/melamine system) compared to pure pigment PR 254 (IRGAZIN RED 2030): stir-in: 103%.

The product shows the highest gloss and lowest haze compared to the above described comparative products. In addition, the dispersion exhibits no flocculation in a 10:90 reduction.

Example 3

A mixture of 1.65 kg of C.I. Pigment Blue 15:3 (CROMOPHTAL Blue 4GNP from Ciba Specialty Chemicals Inc.) and 1.35 kg of an urea-aldehyde resin (LAROPAL®A81 from BASF AG) is tumbled for 15 minutes. Afterwards, the mixture is metered into a co-rotating twin screw extruder with L/D=43 (D=25 mm; r=300 rpm) with a throughput of 4 kg/h. The temperature profile is set to 130° C. The melt is not degassed. The extrudate is then broken, ground and sieved to particles having a particle size below 500 µm. The concentration of C.I. Pigment Blue 15:3 in the preparation is 55% by weight. The colourstrength of the preparation is: in solvent paint (alkyd/melamine system) compared to pure PB15:3 (CROMOPHTAL Blue 4GNP): stir-in: 105%.

The product is slightly more saturated and shows the highest gloss and lowest haze compared to the above described comparative products. In addition, the dispersion exhibits no flocculation in a 10:90 reduction.

Example 4

A mixture of 0.75 kg of C.I. Pigment Yellow 34 (HORNACHROME Yellow GUH41 from Ciba Specialty Chemicals Inc.) and 0.25 kg of an urea-aldehyde resin (LAROPAL®A81 from BASF AG) is tumbled for 15 minutes. Afterwards, the mixture is metered into a co-rotating twin screw extruder with L/D=14 (D=16 mm; r=250 rpm) with a throughput of 3.6 kg/h. The temperature profile is set to 110° C. The melt is not degassed. The extrudate is then broken, ground and sieved to particles having a particle size below 500 µm. The concentration of C.I. Pigment Yellow 34 in the preparation is 75% by weight.

The colourstrength of the preparation is: in solvent paint (alkyd/melamine system) compared to pure PY 34 (HORNACHROME Yellow GUH41): stir-in: 124%.

The product is considerably higher saturated and shows the highest gloss and lowest haze compared to the above described comparative products. In addition, the dispersion exhibits no flocculation in a 10:90 reduction.

What is claimed is:

1. A process for preparing a pigment composition comprising
   a) mixing a pigment and a urea-aldehyde resin and/or a urea-ketone resin in a homogenizer or in the inlet (feeding) zone of the extruder, and
   b) extruding the mixture obtained in step a).

2. A process according to claim 1, wherein the mixing is carried out in a homogenizer.

3. A process according to claim 1, wherein the pigment is an organic pigment selected from the group consisting of azo, azomethine, methine, anthraquinone, phthalocyanine, pennone, perylene, diketopyrrolopyrrole, thioindigo, iminoisoindoline, dioxazine, iminoisoindolinone, quinacridone, flavanthrone, indanthrone, anthrapynmidine and quinophthalone pigments, and mixtures or solid solutions thereof; especially an azo, dioxazine, diketopyrrolopyrrole, quinacridone, phthalocyanine, indanthrone or iminoisoindolinone pigment, or a mixture or solid solution thereof.

4. A process according to claim 1, wherein the pigment is an inorganic pigment selected from the group consisting of carbon black, metal oxides, mixed metal oxides, antimony yellow, lead chromate, lead chromate sulfate, lead molybdate, ultramarine blue, cobalt blue, manganese blue chrome oxide green, hydrated chrome oxide green, cobalt green, metal sulfides. cadmium sulfoseienides, zinc ferrite, and bismuth vanadate, and mixtures thereof.

5. A pigment composition obtained by the process according to claim 1.

6. A pigmented high molecular weight organic material, which comprises a tinctorially effective pigmenting amount of a pigment composition according to claim 5 and a high molecular weight organic material.

7. A pigment composition consisting essentially of pigment and urea-aldehyde resin, wherein the weight ratio of pigment to urea-aldehyde resin is generally in the range of 40:60 to 90:10.

8. A process for the preparation of a pigmented high molecular weight organic material, which comprises incorporating a pigment composition according to claim 5 into the high molecular weight organic material.

9. A process according to claim 2, wherein the pigment is an organic pigment selected from the group consisting of azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, and mixtures or solid solutions thereof; especially an azo, dioxazine, diketopyrrolopyrrole, quinacridone, phthalocyanine, indanthrone or iminoisoindolinone pigment, or a mixture or solid solution thereof.

10. A process according to claim 2, wherein the pigment is an inorganic pigment selected from the group consisting of carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, and mixtures thereof.

11. A pigmented high molecular weight organic material, which comprises a tinctorially effective pigmenting amount of a pigment composition according to claim 7 and a high molecular weight organic material.

12. A process for the preparation of a pigmented high molecular weight organic material, which comprises incorporating a pigment composition according to claim 7 into the high molecular weight organic material.

13. A pigment composition obtained by the process according to claim 2.

14. A pigment composition obtained by the process according to claim 3.

15. A pigment composition obtained by the process according to claim 4.

16. A pigment composition obtained by the process according to claim 9.

17. A pigment composition obtained by the process according to claim 10.

18. A process according to claim 2, wherein the homogenizer tumbler.

* * * * *